United States Patent [19]

Braun

[11] Patent Number: 5,033,682
[45] Date of Patent: Jul. 23, 1991

[54] GRINDING PROCESS

[75] Inventor: Willy Braun, East Brighton, Australia

[73] Assignee: ICI Australia Operations Propreitary Limited, Melbourne, Austria

[21] Appl. No.: 259,600

[22] Filed: Oct. 19, 1988

[30] Foreign Application Priority Data

Oct. 20, 1987 [AU] Australia .................................. PI4990

[51] Int. Cl.$^5$ .......................... B02B 5/02; B01B 1/00; B24B 1/00
[52] U.S. Cl. ..................................... 241/16; 241/184; 241/22; 51/317
[58] Field of Search ...................... 241/46.17, 184, 172, 241/97, 16, 22; 51/317, 313

[56] References Cited

U.S. PATENT DOCUMENTS

| | | | |
|---|---|---|---|
| 2,764,359 | 9/1959 | Szegvari | 241/46.17 X |
| 3,149,789 | 9/1964 | Szegvari | 241/27 |
| 3,998,938 | 12/1976 | Szegvari | 423/594 |
| 4,059,232 | 11/1977 | Engels | 241/46.17 |
| 4,274,599 | 6/1981 | Manfroy et al. | 241/16 |
| 4,448,609 | 5/1984 | Tear | 106/443 |
| 4,496,106 | 1/1985 | Gross | 241/46.17 |

FOREIGN PATENT DOCUMENTS 0058886 9/1982 European Pat. Off. .
3437866 4/1986 Fed. Rep. of Germany .

OTHER PUBLICATIONS

Mankosa, Power Technology, 1986, 7-82.
Mankosa et al., *Power Technology*, 49:75-82 (1986).

*Primary Examiner*—Frederick R. Schmidt
*Assistant Examiner*—Bruce P. Watson
*Attorney, Agent, or Firm*—Cushman, Darby & Cushman

[57] ABSTRACT

A process of grinding ceramic materials such as zirconia comprises grinding in an agitated media-type mill in the presence of a dispersant, the process being characterized in that the grinding media has a particle size of from 0.8 3.0 mm, and in that the quantity of media present is such that the average stand-off distance between adjacent media particles is from 30-90 um.

The preferred apparatus is an attrition mill with an additional holding tank which allows recycling.

The ceramic powders thus produced are fine with an unusually narrow particle size distribution.

8 Claims, No Drawings

GRINDING PROCESS

This invention relates to a process for grinding ceramic materials.

BACKGROUND OF THE INVENTION

There is currently considerable interest in the production of ceramic materials such as zirconia for use in a variety of technologically advanced applications. In most cases it is required that the starting material for a ceramic article be a powder of very fine particle size.

The grinding of powders to a fine size is a technology which has been highly researched, the object being to achieve for any given application the most efficient grinding, that is, the finest possible particle size in the shortest possible time with the least possible input of energy. The best possible grinding for a given material usually involves a compromise in one or more of these requirements.

Grinding means may be conveniently divided into two types, high energy types and low energy types. The former types include sand, bead and shot mills, and the latter include agitated media mills such as "attritors".

In high energy mills, efficient grinding requires that there be sufficient "stand-off" distance between the particles of grinding media. This is well described in the authoritative "Paint Flow and Pigment Dispersion" by Temple C. Patton (2nd Ed., Wiley, 1979) at pages 451-452. Here Patton concludes that an average stand-off distance of 60 um is required for optimum results.

Low energy grinding means are not restricted in this manner and a wide range of proportions of grinding media/fluid/material to be ground can be achieved. Patton (at page 440) states that there is little point in using grinding media of size lower than about 3 mm in such an apparatus as efficiency drops and grinding times become excessively long. There have, however, been experiments with smaller grinding media in attrition mills. For example, Mankosa, Adel and Yoon describe the use of small (1.6 mm) media in the attrition milling of coal ("Powder Technology", 49 (1986), 75-82). However, this reference did not record the attainment of any particle size below 2 um.

SUMMARY OF THE INVENTION

It has now been found that agitated media milling with unusually fine grinding media can be used for the grinding of ceramics, but that this, surprisingly, will work efficiently only if parameters normally adhered to in high energy processes are employed. There is therefore provided, according to the present invention, a process of grinding ceramic materials by grinding in an agitated media mill and in the presence of a dispersant, the process being characterized in that
(a) the grinding media has a particle size of from 0.8–3.0 mm; and
(b) the quantity of media present is such that the average stand-off distance between adjacent media particles is from 30–90 um.

This need for a particular standoff distance is surprising in that agitated media mills were believed to be relatively insensitive to such considerations. The achievement of the desired stand-off distance also requires a higher media to material ratio than is normally the case with agitated media mills.

By "agitated media mill" is meant a mill wherein the grinding media are caused to move not by the movement of the mill itself but by the rotation of an axial shaft which comprises agitating elements which cause the media to move as the shaft is rotated. A typical example of such an agitated media mill is a vertical cylinder within which an axial shaft equipped with several series of radial arms along its length is caused to rotate. The cylinder is partially filled with grinding media, liquid and material to be ground, and the rotating shaft and arms cause the media to move; this type of mill is commonly known as an "attrition mill". Typical attrition mills are described in, for example, U.S. Pat. Nos. 2,764,359, 3,149,789 and 3,998,938 and the theoretical and practical aspects of their operation are well described in the Patton reference hereinabove mentioned and in published Australian Application No. 10975/83. An especially useful version of the attrition mill is one in which the liquid and material to be ground is cycled through the mill via an associated holding tank. Such an apparatus is described in, for example, Australian Patent No. 486343 in connection with a process involving high throughputs (at least 30 volumes of the liquid dispersing capacity of the attritor vessel ("dispersion volumes") per hour). Such high throughputs have not been found necessary in the working of this invention; it is preferred to have a throughput of 5–6 dispersion volumes per hour.

The grinding medium for use in this invention has a particle size of from 0.8–3.0 mm. It must of course be capable of grinding ceramic materials and typical grinding media suitable for use in this invention are partially-stabilized zirconia, aluminia, steatite and steel.

The dispersant for use in this invention may be any dispersant known to the art to be useful in the grinding of ceramics. A typical example is ammonium polyacrylate. A useful alternative is ammonia or an alkylamine, as described in co-pending Australian Application PI 8835.

It is the general practice of the art to add all of the dispersant at the start of the process, but it has been found that, for many ceramic materials, it is advantageous to add the dispersant gradually throughout the process time. The best method for a given material can readily be determined by simple experimentation. In either case, addition may be made of the dry dispersant or of the dispersant in dispersion/solution form. When addition is gradual, it may be continuous or in discrete amounts.

The rate of addition should be such that flocculation of the ceramic is essentially absent. By "flocculation" is meant the aggregation of individual particles to form hard, difficult-to-disperse particulates; the presence of such particulates can greatly reduce the efficiency of the grinding process and result in an inferior end-product. The addition of the dispersant must therefore be such that flocculation is essentially absent, in other words, that only a very minimal degree of flocculation occurs. Such a minimal degree is permissible, and is readily detectable by the skilled person who can then add more dispersant or increase the flow thereof such that it gets no worse.

This can readily be done, for example, by using a particle size analyzer such as a "Microtrac" (trade mark). A sample is taken, analyzed in respect of particle size, treated with a very good dispersant such as tetra-potassium pyrophosphate (TKPP) and again analyzed in respect of particle size. A post-TKPP addition result which is within experimental error of the pre-TKPP result means that the degree of flocculation is acceptable.

A feature of this invention is the necessity to adhere to the type of stand-off distance which is a feature of high energy grinding. There is no known explanation for this, but it is critical to the working of the invention. Stand-off distances in the range of from 30 um-90 um, but it has been found that, when the stand-off distance is below 50 um, the temperature of the mill contents becomes rather high. This is disadvantageous, especially when a volatile dispersant such as ammonia is being used, and cooling involves extra expense. It is therefore preferred that the stand-off distance be no lower than 50 um. Preferably the standoff distance is of the order of 60 um.

The process of this invention is particularly suited to the grinding of ceramics. The ceramic powders produced as a result are especially fine with an unusually narrow particle size distribution. Moreover, the process is much more efficient in that grinding times are shorter, viscosities are lower and less dispersant is required. The invention therefore also provides a ceramic powder produced by a grinding process as hereinabove described.

DESCRIPTION OF PREFERRED EMBODIMENTS

The invention is further illustrated by reference to the following example.

EXAMPLE 1

An attritor of 5 L. capacity was loaded with 12,000 g. of 0.8 mm yttria-modified zirconia balls (ex Shinegawa Co., Japan). To this was added 2000 g. zirconia of particle size range about 15-35 um, 857 g. of water and 120 g. of a dispersant (a 40% active solids solution of ammonium polyacrylate in water). The concentration of dispersant on zirconia solids was 2.4% by weight and the stand-off distance was 50 um.

The contents of the attritor were milled at 300 rpm for 4.5 hours. A sample was extracted, diluted with water at a rate of 1 part of sample to 10 parts of water, subjected to ultrasonic vibrations for 5 minutes and analyzed by a "Microtrac" particle size analyzer (ex Leeds & Northrup). The sample was then treated with a few drops of a 10% aqueous solution of TKPP, subjected again to 5 minutes of ultrasonic vibrations and again analyzed. The results are shown in the following table:

| At least this many percent of particles... | ... have a particle size not greater than (um) | |
| --- | --- | --- |
| | pre-TKPP addition | post-TKPP addition |
| 10 | 0.13 | 0.13 |
| 50 | 0.25 | 0.21 |
| 90 | 0.94 | 0.39 |

Microscopic examination revealed the presence of flocculated particles in the pre-TKPP addition sample.

The experiment was repeated except that half of the dispersant was added at the beginning of the grinding and the remainder was diluted and added in equal quantities every 15 minutes over 3.5 hours. The results were as follows:

| At least this many percent of particles... | have a particle size not greater than (um) | |
| --- | --- | --- |
| | pre-TKPP addition | post-TKPP addition |
| 10 | 0.13 | 0.13 |
| 50 | 0.21 | 0.22 |
| 90 | 0.38 | 0.42 |

The lack of flocculation can readily be seen.

The product of the repeated experiment was a fine dispersion of zirconia particles. When measured on a HORIBA CAPA 700 particle size analyzer, 100% of the particles had sizes between 0.5 um and 0.06 um. The size range of the particles was also narrow, 80% of particles being between 0.3 and 0.1 um.

EXAMPLES 2-7

Example 1 was repeated with varying volumes of "slip" (zirconia+water) per a fixed quantity of grinding medium, the weight percentage of zirconia in the slip being constant in all examples of 60%. The dispersant used in all examples was "Reotan" (trade mark) LA, a 40% active ammonium polyacrylate solution, and it was added at the same rate to all examples, 0.8% by weight of zirconia initially and then 0.2% after one hour of grinding. The results were as follows:

| | Example No. | | | | | |
| --- | --- | --- | --- | --- | --- | --- |
| | 2 | 3 | 4 | 5 | 6 | 7 |
| Ml. slip/ 1000 g · grinding medium | 90 | 100 | 110 | 120 | 130 | 140 |
| Stand-off distance (um) | 31 | 41 | 51 | 61 | 71 | 81 |
| Temperature range (°C.) | 53-59 | 52-55 | 45-50 | 44-50 | 43-52 | 42-51 |
| Time for 90% of ZrO2 particles to reach 0.42 um (hr) | 2 | 2.5 | 3 | 3 | 4 | 4 |
| Output g · ZrO2/ 1000 parts grinding medium per hr. | 54.0 | 48.0 | 44.0 | 48.0 | 39.0 | 42.0 |
| 90% particle size after | | | | | | |
| 1 hr. | 0.87 | 1.02 | 1.65 | 1.56 | 1.80 | 2.32 |
| 2 hr. | 0.43 | 0.52 | 0.77 | 0.70 | 0.81 | 1.00 |
| 3 hr. | | 0.41 | 0.42 | 0.43 | 0.49 | 0.77 |
| 4 hr. | | | | | 0.43 | 0.43 |

It can readily be seen that the quickest reduction to size was achieved when low stand-off distances were used. This was offset by the higher temperatures and by the fact that the grinding media in these examples suffered excessive wear, thus reducing their useful lives. The 61 um stand-off distance may be seen as representing a good compromise of grinding time and temperature; the grinding medium was also in relatively good condition at the end of the process.

EXAMPLE 8

An example illustrating the grinding of alumina.

85 g. alpha - alumina, surface area 8 $m^2/g$; average particle size 75 um, was milled in an attrition mill as described in Example 1. The grinding media used was 3 mole percent yttria-modified zirconia (Y - T2P) of 1 mm diameter. The contents of the mill comprised the alumina, 1110 g grinding media and 84 g. water. The total slip volume was 105 ml and the stand-off distance was 45 um.

The pH of the mill contents was adjusted to 3 with acetic acid prior to milling and the tip speed used in the milling was 440 r.p.m., milling being carried out for 1 hour.

The particle size was found to be very fine, with over 90% of the particles being below 0.43 um and 50% below 0.24 um.

EXAMPLE 9

A comparative example illustrating an attempt to grind the alumina of Example 8 by ball milling.

5.2 g of the alumina of Example 8 was loaded to a ball mill with 20 ml water. pH was adjusted to 3 and the slip milled for 40 hours at 120 r.p.m. with 120 g of 5 mm alumina balls in a mill of 55 mm height and 60 mm diameter. The particle size was measured as 50% of particles having a diameter of less than 0.69 um and 90% of particles less than 2.50 um.

The performance of the process according to the invention is clearly superior.

We claim:

1. In a low energy process of grinding ceramic materials by grinding the ceramic material in an agitated media mill including an agitated particulate grinding media and in the presence of a dry or liquid dispersant, the improvement which comprises using a
   - grinding media which has a particle size of from 0.8–3.0 mm; and
   - a quantity of grinding media such that the average stand-off distance between adjacent media particles is from 30–90 um.

2. A process according to claim 1, wherein the average stand-off distance is from 50–90 um.

3. A process according to claim 1, wherein the agitated media mill is an attrition mill.

4. A process according to claim 3, wherein the liquid and material to be ground are cycled from a holding tank to the mill.

5. A process according to claim 4, wherein the cycling rate of liquid and material to be ground is from 5–6 volumes of the liquid dispersing capacity of the attrition mill per hour.

6. A process according to claim 1, wherein the dispersant is ammonium polyacrylate.

7. A process according to claim 1, wherein the dispersant is added throughout the grinding process at such a rate that flocculation of the ceramic material is essentially absent.

8. A process as in claim 1, wherein said grinding media has a particle size within the range of 0.8 to 1.0 millimeters.

* * * * *